(12) United States Patent
Luyks

(10) Patent No.: US 8,908,591 B2
(45) Date of Patent: Dec. 9, 2014

(54) WIRELESS ACCESS AND NETWORKING SYSTEM AND METHOD FOR SPACECRAFT

(71) Applicant: Leo Luyks, Huntington Beach, CA (US)

(72) Inventor: Leo Luyks, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 153 days.

(21) Appl. No.: 13/645,514

(22) Filed: Oct. 5, 2012

(65) Prior Publication Data
US 2014/0098739 A1   Apr. 10, 2014

(51) Int. Cl.
H04B 7/185   (2006.01)

(52) U.S. Cl.
USPC ........................... 370/316; 370/252

(58) Field of Classification Search
USPC ......... 370/316, 318, 319, 320, 321, 322, 323, 370/324, 325, 326, 252
See application file for complete search history.

(56) References Cited

U.S. PATENT DOCUMENTS

| | | | |
|---|---|---|---|
| 5,878,034 A | 3/1999 | Hershey et al. | |
| 5,995,833 A | 11/1999 | Zicker | |
| 6,690,934 B1 * | 2/2004 | Conrad et al. | 455/427 |
| 6,725,034 B1 * | 4/2004 | Diris | 455/427 |
| 7,130,646 B2 * | 10/2006 | Wang | 455/456.5 |
| 7,319,878 B2 * | 1/2008 | Sheynblat et al. | 455/456.3 |
| 7,505,736 B2 * | 3/2009 | Min | 455/12.1 |
| 8,044,848 B2 * | 10/2011 | Yeh | 342/357.43 |
| 8,175,514 B2 * | 5/2012 | Lee | 455/3.02 |
| 8,620,306 B2 * | 12/2013 | Pon et al. | 455/427 |
| 2005/0048963 A1 * | 3/2005 | Kubler et al. | 455/423 |
| 2008/0240029 A1 | 10/2008 | Lynch et al. | |
| 2009/0154391 A1 | 6/2009 | Wittenschlaeger | |
| 2010/0290450 A1 * | 11/2010 | Bennett | 370/338 |
| 2010/0309815 A1 * | 12/2010 | Yepez et al. | 370/254 |
| 2011/0189943 A1 * | 8/2011 | Ilarregui et al. | 455/7 |

OTHER PUBLICATIONS

Extended European Search Report and Written Opinion EP13186103.1 dated Mar. 3, 2014.

* cited by examiner

*Primary Examiner* — Kevin Mew
(74) *Attorney, Agent, or Firm* — Ameh IP; Lowell Campbell; Elahe Toosi (57) ABSTRACT

A system and methods for spacecraft wireless access and networking are presented. An orbital position of an orbiting spacecraft is determined, and a wireless access point of a terrestrial wireless communication network is selected from a wireless access point database based on the orbital position. A communication is established with the wireless access point.

20 Claims, 5 Drawing Sheets

WIRELESS ACCESS AND NETWORKING SYSTEM AND METHOD FOR SPACECRAFT

FIELD

Embodiments of the present disclosure relate generally to communication systems. More particularly, embodiments of the present disclosure relate to spacecraft communication systems.

BACKGROUND

Ground to satellite communication is generally performed over dedicated command and control ground infrastructure. The dedicated command and control ground infrastructure generally comprises specialty antennas directed to orbiting spacecraft for communications. The dedicated command and control ground infrastructure and specialty antennas are generally costly to build and operate.

SUMMARY

A system and methods for spacecraft wireless access and networking are presented. An orbital position of an orbiting spacecraft is determined, and a wireless access point of a terrestrial wireless communication network is selected from a wireless access point database based on the orbital position. A communication is established with the wireless access point.

Network system and access methods suitable for cyber engagements provided herein allow space vehicles and high altitude missiles to use terrestrial wireless data networks. Wireless computer networks such as Wi-Fi or WLAN can be accessed from the space vehicles in orbit above terrestrial sites for purposes of communications and network access. In this manner, a low-infrastructure-cost means of space vehicle command and control via existing terrestrial networks is provided that allows data transfer via networks back to users for distribution of space vehicle collected data. Furthermore, the low-infrastructure-cost means of space vehicle command and control via existing terrestrial networks enables wireless access point (WAP) network discovery, mapping and monitoring of Wi-Fi networks from space.

In an embodiment, a method for spacecraft wireless access and networking determines an orbital position of an orbiting spacecraft. The method further selects a wireless access point of a terrestrial wireless communication network from a wireless access point database based on the orbital position. The method further establishes a communication with the wireless access point.

In another embodiment, a system for spacecraft wireless access and networking comprises a navigation module, a network tracking module, and a communication module. The navigation module determines an orbital position of an orbiting spacecraft. The network tracking module selects a wireless access point of a terrestrial wireless communication network from a wireless access point database module based on the orbital position. The communication module establishes a communication with the wireless access point.

In a further embodiment, a method for configuring a wireless local area network access point database for spacecraft wireless access receives a beacon frame signal from a wireless access point at an orbiting spacecraft. The method further measures a wireless access point received signal strength indicator (RSSI) for the beacon frame signal, and determines a wireless access point location of the wireless access point. The method further adds the wireless access point received signal strength indicator (RSSI) and the wireless access point location to a wireless access point database based on the wireless access point location.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to standard communication systems, military communication systems, network protocols, and other functional aspects of the systems (and the individual operating components of the systems) may not be described in detail herein.

Embodiments of the disclosure are described herein in the context of a practical non-limiting application, namely, a communication for a spacecraft application. Embodiments of the disclosure, however, are not limited to such spacecraft applications, and the techniques described herein may also be utilized in other applications. For example, embodiments may be applicable to high-altitude balloons, missiles, and other long distance communication access scenario as may be desirable or appropriate for a given application or environment.

As would be apparent to one of ordinary skill in the art after reading this description, the following are examples and embodiments of the disclosure and are not limited to operating in accordance with these examples. Other embodiments may be utilized and changes may be made without departing from the scope of the exemplary embodiments of the present disclosure.

Embodiments provide a spacecraft access and networking system and method for cyber engagements. The system and method allows a space vehicle (e.g., a satellite, a missile, etc.) to access a terrestrial network for communications, data transfer, network discovery, mapping and monitoring. The system and method may be used while the space vehicle is in orbit or over-flight of Earth above terrestrial wireless data networks.

Figure 1:
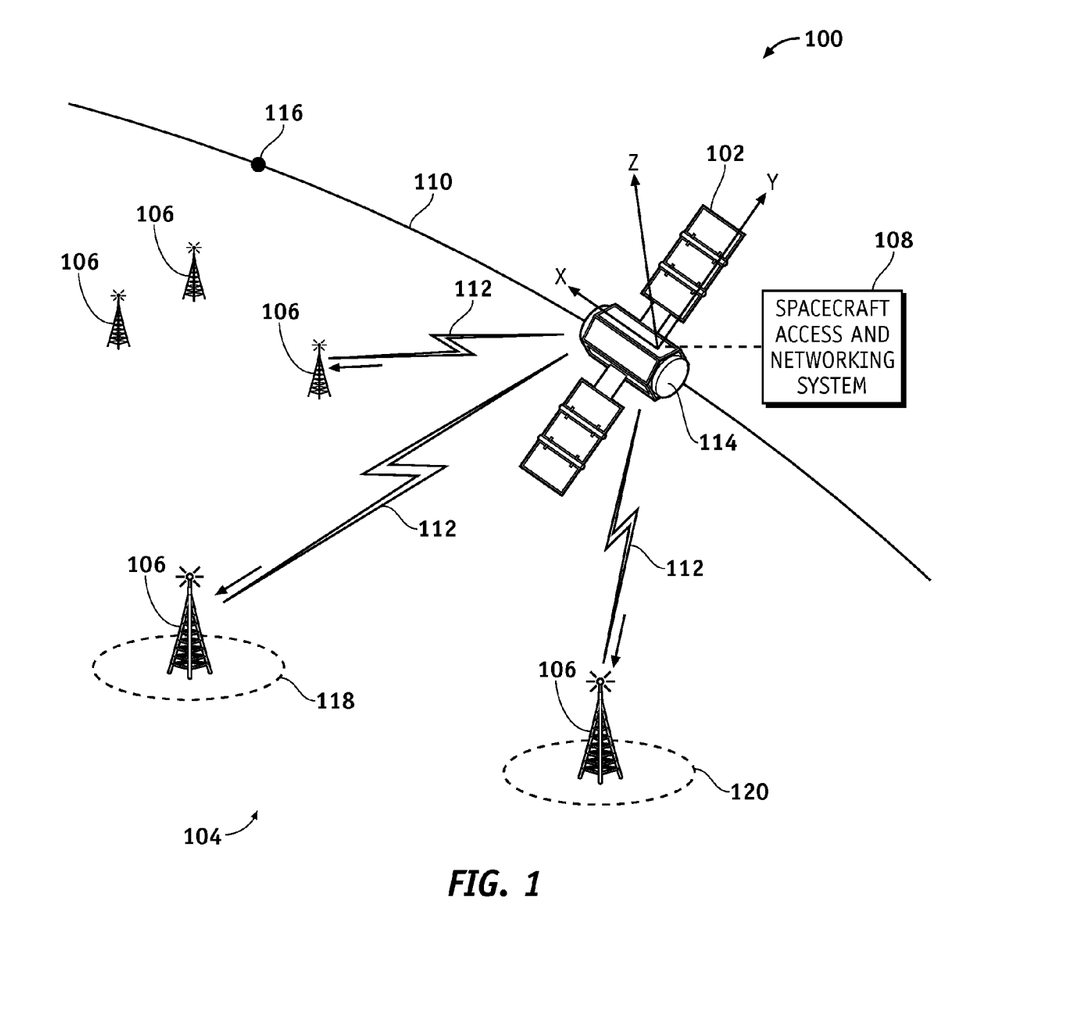
FIG. 1 is an illustration of an exemplary wireless communication environment for wireless communication between a terrestrial network and a space vehicle according to an embodiment of the disclosure.

FIG. 1 is an illustration of an exemplary wireless communication environment 100 for wireless communication between a terrestrial wireless communication network 104 (terrestrial network 104) and a space vehicle 102 according to an embodiment of the disclosure. The wireless communication environment 100 comprises the space vehicle 102 (orbiting spacecraft 102), the terrestrial network 104, and a spacecraft access and networking system 108 (system 108).

The space vehicle 102 may be located at an orbital position 114 having an X-Y-Z coordinate on an orbit 110. The space vehicle 102 may comprise, for example but without limitation, a spacecraft, a high altitude missile, a high altitude balloon, a satellite, or other space vehicle.

The terrestrial network 104 may comprise a closed commercial network comprising communication channels 112 configured to support one or more wireless data communication protocols such as, but without limitation, Wi-Fi™, the Third Generation Partnership Project Long Term Evolution (3GPP LTE)™, Third Generation Partnership Project 2 Ultra Mobile Broadband (3Gpp2 UMB)™, Time Division-Synchronous Code Division Multiple Access (TD-SCDMA)™, and Wireless Interoperability for Microwave Access (WiMAX)™, or other wireless communication protocol.

A Wi-Fi network 104 is used as an example of the terrestrial network 104 in this document. Also, a Wi-Fi access point 106 is used as example of an access point 106 or a wireless access point 106 in this document. The wireless access point 106 may be located at a wireless access point location 118/120.

The access and networking system 108 may be coupled to the space vehicle 102. The system 108 is configured to track, identify, and link the access points 106 to the space vehicle 102 as explained in more detail below. The system 108 allows wireless computer networks such as the terrestrial network 104 to be accessed from the space vehicle 102 at the orbital position 114 in the orbit 110 above the terrestrial network 104 for purposes of communications and network access. The system 108 allows the space vehicle 102 to access the terrestrial network 104 for applications such as, but without limitation, communications, data transfer, network discovery, mapping and monitoring while in orbit and/or over-flight of Earth above the terrestrial network 104.

The system 108 may also provide wireless router services for systems on-board the space vehicle 102. Geographical location mapping of the access points 106 may be accomplished with an incorporation of data from a Global Positioning System (GPS). Signals from wireless video transmitters may also be accessed by the system 108. Network denial of service or jamming may also be conducted from the system 108.

Figure 2:
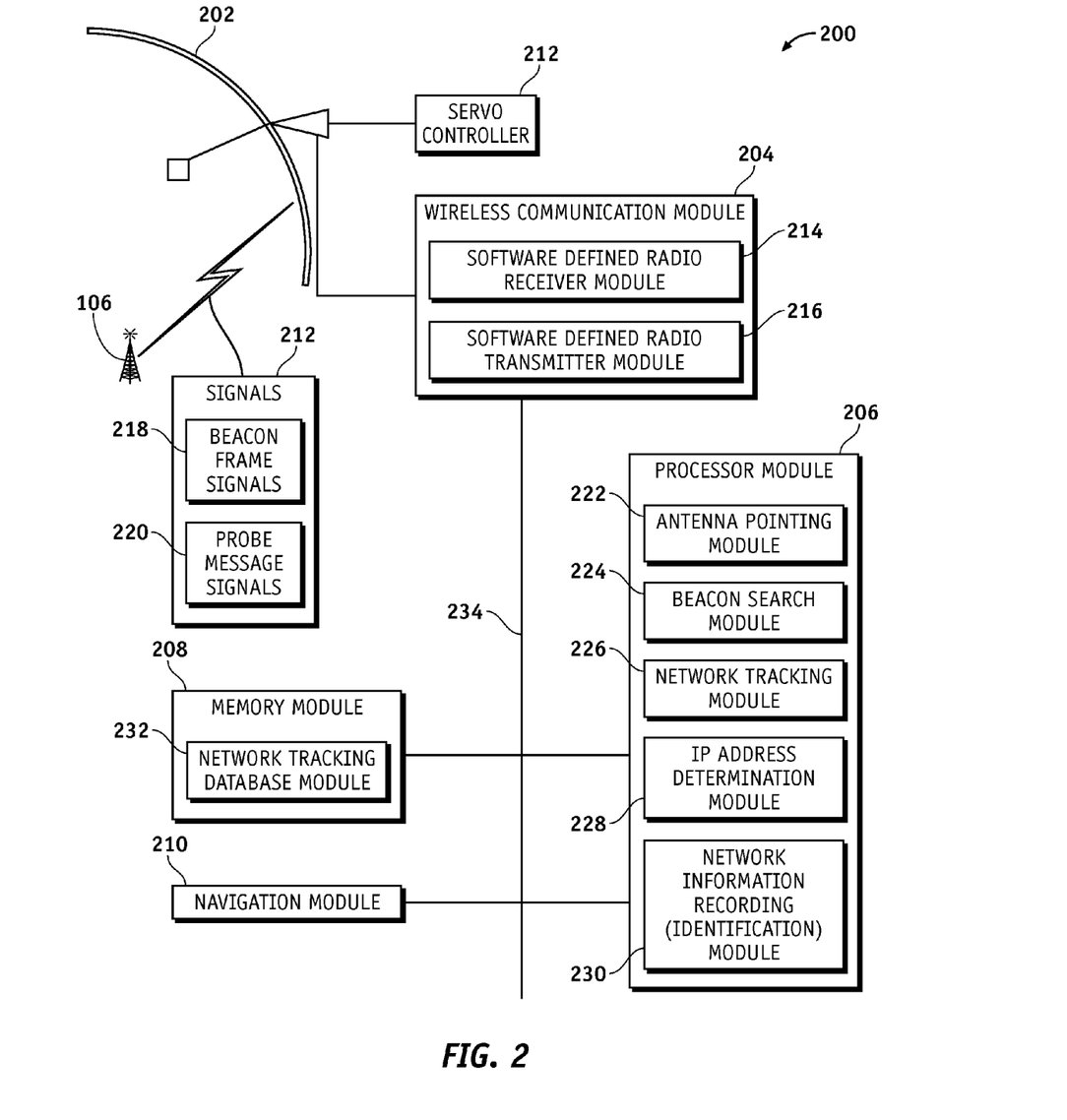
FIG. 2 is an illustration of an exemplary schematic functional block diagram of spacecraft access and networking system according to an embodiment of the disclosure.

FIG. 2 is an illustration of a schematic functional block diagram of a spacecraft wireless access and networking system 200 (system 200, similar to system 108 in FIG. 1) according to an embodiment of the disclosure. The various illustrative blocks, modules, processing logic, and circuits described in connection with the system 200 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The embodiment shown in FIG. 2 may have functions, material, and structures that are similar to the embodiments shown in FIG. 1. Therefore common features, functions, and elements may not be redundantly described here.

The system 200 allows the terrestrial network 104 such as Wi-Fi or WLAN to be accessed from the space vehicle 102 in the orbit 110 above the terrestrial network 104 for purposes of communications and network access as explained above.

The system 200 may comprise an antenna structure 202, a wireless communication module 204, a processor module 206, a memory module 208, and a navigation module 210. The illustrated system 200 depicts a simple embodiment for ease of description. These and other elements of the system 200 are interconnected together, allowing communication between the various elements of the system 200. In one embodiment, these and other elements of the system 200 may be interconnected together via a data communication bus 234.

In operation, beacon frame signals 218 such as Wi-Fi beacon frame signals 218 are transmitted periodically from the Wi-Fi access points 106 to announce a presence of the Wi-Fi network 104. The processor module 206 searches for the Wi-Fi beacon frame signals 218 while in detection mode by moving the antenna structure 202 in a scanning fashion targeting areas expected to contain the access points 106 based on known geography and previous contacts. Access points 106 with hidden Service Set Identifiers (SSIDs) can be detected by monitoring traffic in the Wi-Fi network 104. The processor module 206 can also analyze network traffic and packets to gather information about the access points 106 and associated networks.

The antenna structure 202 may comprise, for example, a gimbaled or phased array antenna that can be directed to various of the access points 106 via a servo controller 212. Although in substantially simple embodiments of the system 200 only one antenna structure 202 for receiving information and transmitting information may be required, substantially more sophisticated embodiments of the system 200 may be provided with multiple and/or more complex antenna configurations. The antenna structure 202 is optimized to support high gain and narrow beam width to facilitate radio frequency (RF) link up with the Wi-Fi network 104, when the Wi-Fi network 104 comprises a substantially low power. For example, with an approximately 80 km (50 mile, 264,000 ft.) altitude of the space vehicle 102, an approximate ground footprint of a 2.5 deg. beamwidth antenna half power (−3 dB) beamwidth is approximately 8 square km (3 square miles).

Within such a coverage cell, there may be many of the Wi-Fi access points 106, and the system 200 is configured to discern desired signals. For example, a desired signal may be determined by maximizing an altitude at which the space vehicle 102 may operate while still meeting Wi-Fi link performance needs. The system 200 employs properties of Wi-Fi signals which may propagate for long distances into an atmosphere with limited attenuation when not obstructed.

The wireless communication module 204 comprises a receiver module 214 (e.g., a software defined radio (SDR) receiver module 214) and a transmitter module 216 (e.g., a software defined radio (SDR) transmitter module 216). The receiver module 214 and the transmitter module 216 are coupled to the antenna structure 202. Additionally, although not shown in this FIG. 2, those skilled in the art will recognize that a transmitter may transmit to more than one receiver, and that multiple transmitters may transmit to a same receiver.

The receiver module 214 is operable to receive the received Wi-Fi beacon frame signals 218 via the antenna structure 202. The Wi-Fi beacon frame signals 218 are transmitted periodically from the Wi-Fi access points 106 to announce presence of a terrestrial network such as the Wi-Fi network 104. The processor module 206 searches for Wi-Fi beacon frame signals 218 while in detection mode by moving the antenna structure 202 in a scanning fashion targeting areas expected to contain the Wi-Fi access points 106 based on known geography and previous contacts as explained in more detail below.

The transmitter module 216 is operable to transmit probe message signals 220 searching for the Wi-Fi access points 106.

Each receiver module 214 (SDR receiver module 214) and each transmitter module 216 (SDR transmitter module 216) may support a Software Defined Radio (SDR) architecture, or other configuration suitable for wireless access and networking of the space vehicle 102 with the access points 106 as described herein. For example, the Software Defined Radio (SDR) architecture may be compatible with a Wi-Fi standard 802.11 frequency and protocol supporting 2.4 frequency band. For another example, a 3.6 and/or 5 GHz Wi-Fi standard 802.11 frequency band operation may be used, while compensating for additional signal attenuation due to the 3.6 and 5 GHz frequency bands. SDR protocol code may be implemented in the processor module 206 and be configured to control operations of the wireless communication module 204.

The SDR receiver module 214 is configured to detect the Wi-Fi beacon frame signals 218 and to optimize antenna pointing to facilitate link performance for desired signals. Using an RF link to the Wi-Fi network 104, the wireless communication module 204 can request network association and authentication and/or disassociation within 802.11 protocols. The SDR receiver module 214 may be configured to vary MAC address as needed for proper network function and/or clandestine operation.

The system 200 may be configured to support encryption methods comprising, for example but without limitation, WEP Wired Equivalent Privacy (WEP), Wi-Fi Protected Access (WPA), WPA2, or other encryption method.

The processor module 206 is configured to support functions of the system 200. The processor module 206 may control operations of the system 200 so that processes of the system 200 are suitably performed. For example, the processor module 206 controls SDR generated 802.11 frames generated by a beacon search module 224 and fields in the frames, and directs the antenna structure 202 and the wireless communication module 204 to access the access point 106 in-view. The processor module 206 may comprise, for example, an antenna pointing module 222, the beacon search module 224, a network tracking module 226, an IP address determination module 228, a network information recording module 230, or other suitable module.

The antenna pointing module 222 is configured to control the servo controller 212 to point the antenna structure 202 toward a desired access point 106. The desired access point 106 may be determined by the beacon search module 224 detecting a Wi-Fi beacon frame signal from the Wi-Fi beacon frame signals 218 and optimizing antenna pointing of the antenna pointing module 222 to facilitate link performance for a desired Wi-Fi beacon frame signal. The antenna pointing module 222 then places an antenna boresight and beamwidth in a desired direction in accordance with the desired Wi-Fi beacon frame signal to facilitate network discovery or linkup. Upon establishing an RF link with the Wi-Fi network 104, the system 200 can request network association and authentication with the Wi-Fi network 104 or disassociation within the 802.11 protocols. An SDR configured system may be configured to vary its Media Access Control (MAC) address as needed.

The beacon search module 224 searches for Wi-Fi beacon frame signals 218 while in detection mode by moving the antenna structure 202 in a scanning fashion targeting areas expected to contain the Wi-Fi access points 106 based on known geography and previous contacts as explained in more detail below.

The network tracking module 226 is configured to monitor traffic in the Wi-Fi network 104 to detect the Wi-Fi access points 106 with hidden Service Set Identifiers (SSIDs).

The IP address determination module 228 is configured to determine IP address of the Wi-Fi beacon frame signals 218 (SDR generated 802.11 frames).

The network information recording module 230 is configured to record network information and other information of various access points 16 within its field of regard. For example, the network information recording module 230 may be configured to record network information, such as but without limitation, latitude and longitude of the access points 106, MAC address of the access points 106, base station identifier (BSSID) of the access points 106, Internet Protocol (IP) address of the access points 106 (e.g., if accessed previously), password/key of the access points 106 (e.g., as needed), collected beacon frame signals for later analysis, or other information of various access points 106 within its field of regard. This information may then be stored in a network tracking database module 232 (wireless access point database module 232) and used by the beacon search module 224 to search for the Wi-Fi beacon frame signals 218 targeting areas expected to contain the Wi-Fi access points 106 based on known geography and previous contacts.

Processor module 206 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processor module 206 may be an embedded PC type or equivalent computer capable of running an operating system (OS) such as Linux. In this manner, a processor may be realized as a microprocessor, a controller, a microcontroller, a state machine, or other hardware and/or software.

A processor may also be implemented as a combination of computing devices, e.g., a combination of a digital signal processor and a microprocessor, a plurality of microprocessors, one or more microprocessors in conjunction with a digital signal processor core, or any other such configuration. In practice, processor modules 206 comprise processing logic that is configured to carry out the functions, techniques, and processing tasks associated with the operation of the system 200.

Furthermore, the steps of a method or algorithm described in connection with the embodiments disclosed herein may be embodied directly in hardware, in firmware, in a software module executed by processor module 206, or in any practical combination thereof.

The memory module 208 may include a network tracking database module 232 for storing information about the Wi-Fi network 104 in accordance with an embodiment of the disclosure. The network tracking database module 232 may be configured to store, maintain, and provide data as needed to support the functionality of the system 200 in the manner described below. Moreover, the network tracking database module 232 may be a local database coupled to the processor module 206, or may be a remote database, for example, a central network database, and the like. The network tracking database module 232 may include a lookup table for purposes of storing information about the Wi-Fi network 104.

The network tracking database module 232 is configured to store tracking information for the access points 106 that may be recorded by the network information recording module 230, and other information suitable for operation of the system 200. The network tracking database module 232 may store, information such as but without limitation, latitude and longitude of the access points 106, MAC address of the access points 106, BSSID of the access points 106, IP address of the access points 106 (if accessed previously), password/key of the access points 106 (as needed), collected beacon frame signals for later analysis, or other information.

The network tracking database module 232 may also store, a computer program such as a Wi-Fi compatible protocol code (e.g., SDR protocol code) that is executed by the processor module 206, an operating system, an application program, tentative data used in executing a program processing, or other application.

The memory module 208, may be realized as a non-volatile storage device (non-volatile semiconductor memory, hard disk device, optical disk device, and the like), a random access storage device (for example, SRAM, DRAM), or any other form of storage medium known in the art. The memory module 208 may be coupled to the processor module 206 such that the processor module 206 can read information from and write information to the memory module 208.

As an example, the processor module 206 and memory module 208, may reside in their respective ASICs. The memory module 208 may also be integrated into the processor modules 206. In an embodiment, the memory module 208 may include a cache memory for storing temporary variables or other intermediate information during execution of instructions to be executed by processor module 206. The memory module 208 may also include non-volatile memory for storing instructions to be executed by the processor module 206.

The navigation module 210 may be coupled to the processor module 206 and configured to provide navigation state data for use in geo-location of the access points 106. Network access point 106 geographical location mapping can be accomplished with an incorporation of data from the navigation module 210. The navigation module 210 may comprise Global Positioning System (GPS)/Inertial Navigation System (INS), or other navigation system. Algorithm controls in the device will not transmit at a power above the allowable power in any nation, nor will it use frequencies that are not permitted in any nation.

Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality.

Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

Figure 3:
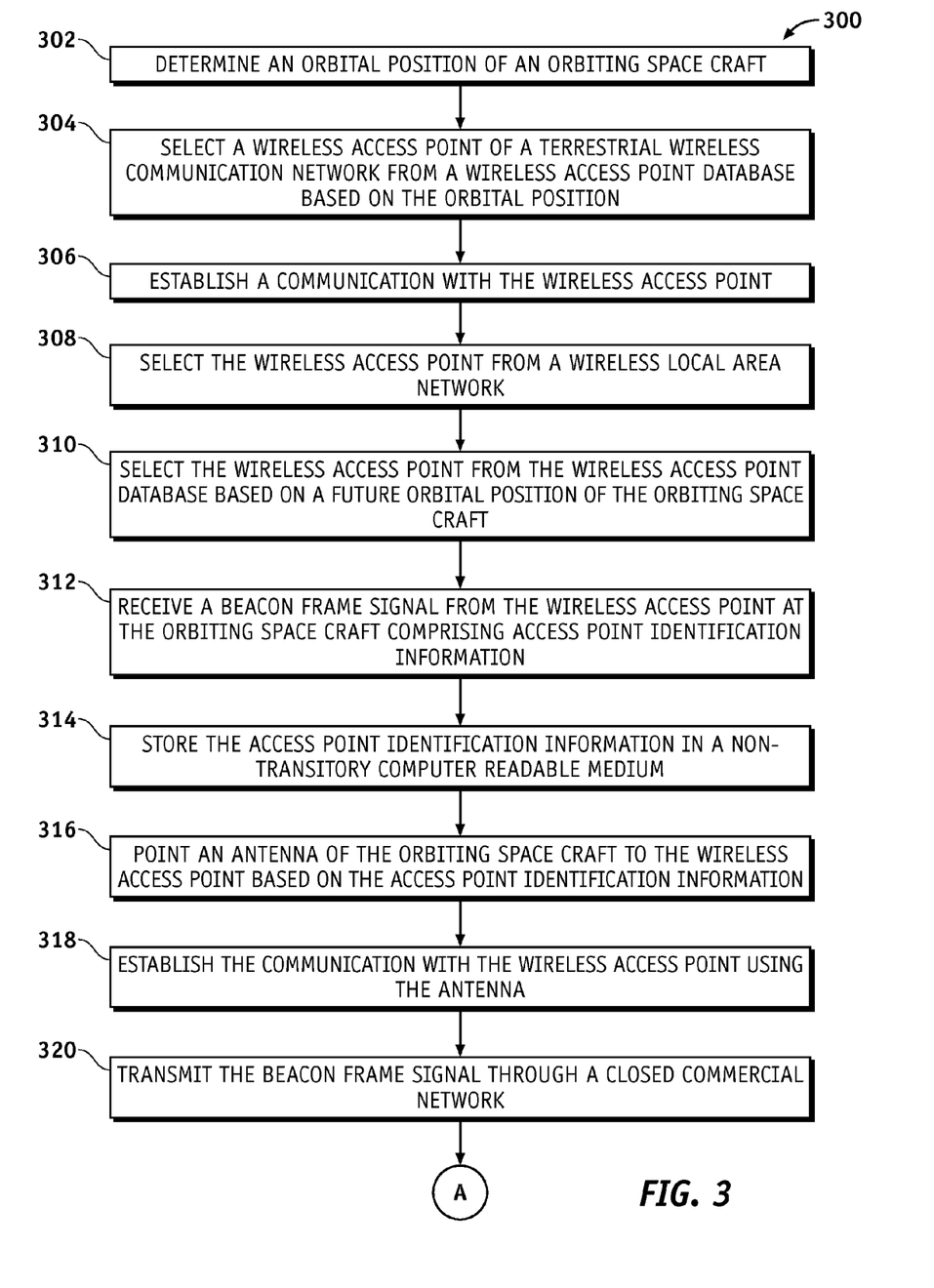
FIG. 3 is an illustration of an exemplary flowchart showing a process for a spacecraft wireless access and networking communication according to an embodiment of the disclosure.

FIG. 3 is an illustration of an exemplary flowchart showing a process 300 for communication according to an embodiment of the disclosure. The various tasks performed in connection with the process 300 may be performed by software, hardware, firmware, a computer-readable medium having computer executable instructions for performing the process method, or any combination thereof. The process 300 may be recorded in a computer-readable medium such as a semiconductor memory, a magnetic disk, an optical disk, and the like, and can be accessed and executed, for example, by a computer CPU such as the processor module 206 in which the computer-readable medium is stored.

It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. In some embodiments, portions of the process 300 may be performed by different elements of the environment 100 and system 200 such as: the processor module 206, the memory module 208, etc. Process 300 may have functions, material, and structures that are similar to the embodiments shown in FIGS. 1-2. Therefore common features, functions, and elements may not be redundantly described here.

Process 300 may begin by determining an orbital position such as the orbital position 114 of an orbiting spacecraft such as the orbiting spacecraft 102 (task 302).

Process 300 may continue by selecting a wireless access point such as the wireless access point 106 of a terrestrial wireless communication network such as the terrestrial wireless communication network 104 from a wireless access point database such as the wireless access point database module 232 based on the orbital position 114 (task 304). The wireless access point 106 may comprise, for example but without limitation, an IEEE 802.11™ access point, an IEEE 802.16™ access point, an industrial, scientific and medical (ISM) band access point, a Digital Enhanced Cordless Telecommunications (DECT)™ access point, a High Performance Radio LAN (HiperLAN)™ access point, a Worldwide Interoperability for Microwave Access (WiMAX)™ access point, a High Performance Radio Metropolitan Area Network (HiperMAN)™, an ultra-wideband access point, or other type of access point.

Process 300 may continue by establishing a communication with the wireless access point 106 (task 306).

Process 300 may continue by selecting the wireless access point 106 from a wireless local area network (WLAN) (task 308).

Process 300 may continue by selecting the wireless access point 106 from the wireless access point database such as the wireless access point database module 232 based on a future orbital position such as a future orbital position 116 (FIG. 1) of the orbiting spacecraft 102 (task 310).

Process 300 may continue by receiving a beacon frame signal such as the beacon frame signal 218 from the wireless access point 106 at the orbiting spacecraft 102 comprising access point identification information (task 312).

Process 300 may continue by storing the access point identification information in a non-transitory computer readable medium (task 314).

Process 300 may continue by pointing an antenna such as the antenna 202 of the orbiting spacecraft 102 to the wireless access point 106 based on the access point identification information (task 316).

Process 300 may continue by establishing the communication with the wireless access point 106 using the antenna 202 (task 318).

Process 300 may continue by transmitting the beacon frame signal 218 through a closed commercial network (task 320). The closed commercial network may comprise the communication channels 112 configured to support one or more wireless data communication protocols such as, but without limitation, Wi-Fi™, the Third Generation Partnership Project Long Term Evolution (3GPP LTE)™, Third Generation Partnership Project 2 Ultra Mobile Broadband (3Gpp2 UMB)™, Time Division-Synchronous Code Division Multiple Access (TD-SCDMA)™, and Wireless Interoperability for Microwave Access (WiMAX)™, or other wireless communication protocol.

Process 300 may continue by selecting the wireless access point 106 from the wireless access point database such as the wireless access point database module 232 based on a wireless access point location such as the wireless access point location 118/120 (FIG. 1) of the wireless access point 106 (task 322).

Process 300 may continue by receiving the beacon frame signal 218 from the wireless access point 106 at the orbiting spacecraft 102 (task 324).

Process 300 may continue by measuring a received signal strength indicator (RSSI) for the beacon frame signal 218 (task 326).

Process 300 may continue by adding the received signal strength indicator (RSSI) and the wireless access point location to the wireless access point database (task 328).

Process 300 may continue by ranking a plurality of wireless access points 106 of the wireless access point database such as the wireless access point database module 232 based on the received signal strength indicator (RSSI) for the beacon frame signal 218 of the wireless access points 106 respectively (task 330).

Process 300 may continue by controlling a power of the communication with the wireless access point 106 based on the wireless access point location 118/120 of the wireless access point 106 (task 332).

Process 300 may continue by controlling the power of the communication with the wireless access point 106 to conform to a regional wireless operational power regulation based on the wireless access point location 118/120 of the wireless access point 106 (task 334).

Process 300 may continue by controlling the orbiting spacecraft 102 using the communication with the wireless access point 106 (task 336).

Process 300 may continue by Doppler compensating communication signals for the communication based on the orbital position 114 (task 338).

Process 300 may continue by selecting the wireless access point 106 from a wireless local area network (WLAN) (task 340).

Figure 4:
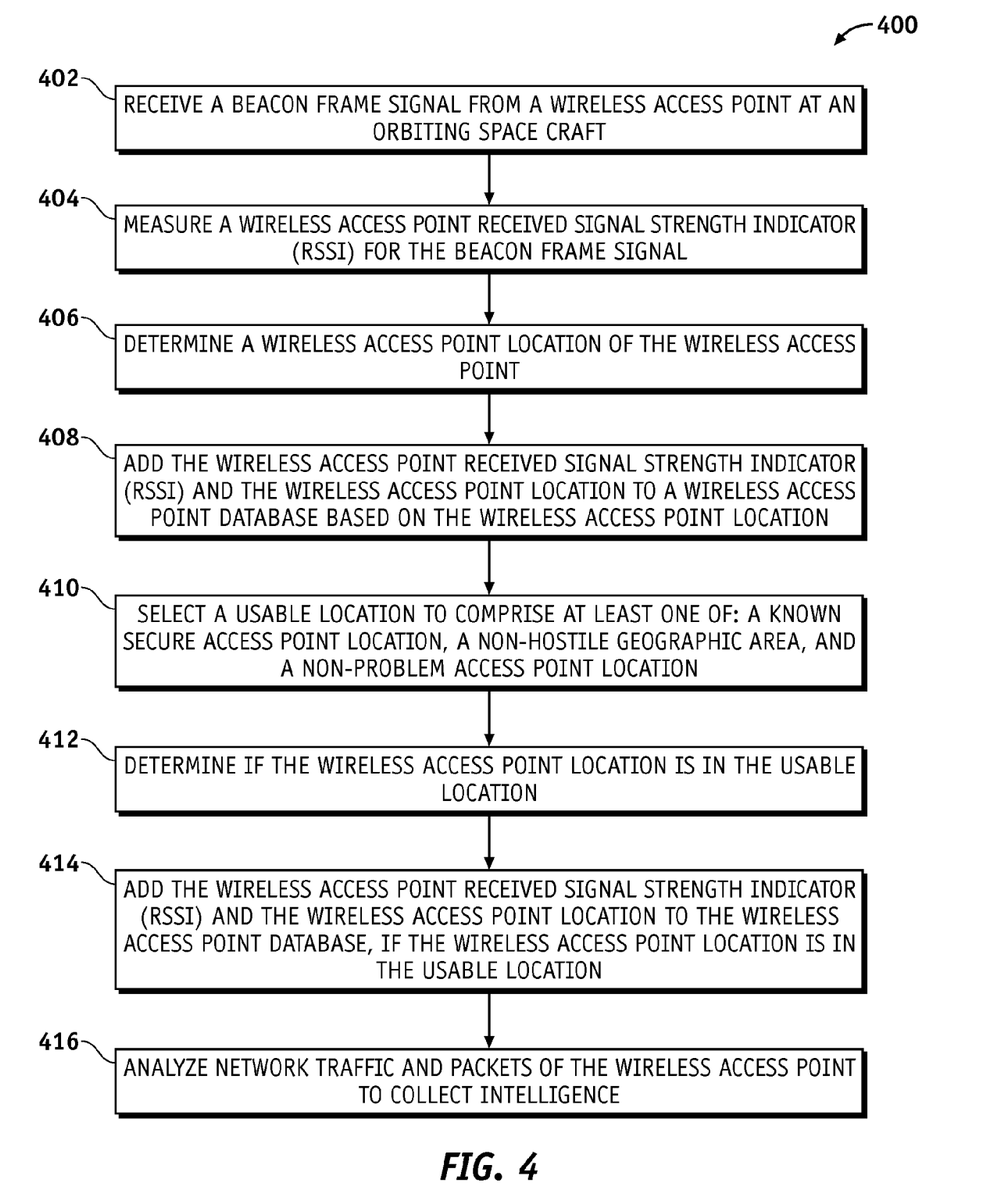
FIG. 4 is an illustration of an exemplary flowchart showing a process for configuring a wireless local area network access point database for spacecraft wireless access according to an embodiment of the disclosure.

FIG. 4 is an illustration of an exemplary flowchart showing a process 400 for configuring a wireless local area network access point database for spacecraft wireless access according to an embodiment of the disclosure. The various tasks performed in connection with the process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU such as the processor module 206 in which the computer-readable medium is stored.

It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. In some embodiments, portions of the process 400 may be performed by different elements of the environment 100 and system 200 such as: the processor module 206, the memory module 208, etc. Process 400 may have functions, material, and structures that are similar to the embodiments shown in FIGS. 1-3. Therefore common features, functions, and elements may not be redundantly described here.

Process 400 may begin by receiving a beacon frame signal such as the beacon frame signal 218 from a wireless access point such as the wireless access point 106 at an orbiting spacecraft such as the orbiting spacecraft 102 (task 402).

Process 400 may continue by measuring a wireless access point received signal strength indicator (RSSI) for the beacon frame signal 218 (task 404).

Process 400 may continue by determining a wireless access point location such as the wireless access point location 118/120 of the wireless access point 106 (task 406).

Process 400 may continue by adding the wireless access point received signal strength indicator (RSSI) and the wireless access point location 118/120 to a wireless access point database such as the wireless access point database module 232 based on the wireless access point location 118/120 (task 408).

Process 400 may continue by selecting a usable location to comprise at least one of: a known secure access point location, a non-hostile geographic area, and a non-problem access point location (task 410).

Process 400 may continue by determining if the wireless access point location 118/120 is in the usable location (task 412).

Process 400 may continue by adding the wireless access point received signal strength indicator (RSSI) and the wireless access point location 118/120 to the wireless access point database such as the wireless access point database module 232, if the wireless access point location 118/120 is in the usable location (task 414).

Process 400 may continue by analyzing network traffic and packets of the wireless access point 106 to collect intelligence (task 416).

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

In this document, the term "module" as used herein, refers to software, firmware, hardware, and any combination of these elements for performing the associated functions described herein. Additionally, for purpose of discussion, the various modules are described as discrete modules; however, as would be apparent one of skilled in the art, two or more modules may be combined to form a single module that performs the associated functions according the embodiments of the present disclosure.

In this document, the terms "computer program product", "computer-readable medium", and the like may be used generally to refer to media such as, for example, memory, storage devices, or storage unit. These and other forms of computer-readable media may be involved in storing one or more instructions for use by the processor modules 206 to cause the processor modules 206 to perform specified operations. Such instructions, generally referred to as "computer program code" or "program code" (which may be grouped in the form of computer programs or other groupings), when executed, enable a method of using a system.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-2 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for spacecraft wireless access and networking, the method comprising:
   determining an orbital position of an orbiting spacecraft;
   selecting a wireless access point of a terrestrial wireless communication network from a wireless access point database based on the orbital position;
   receiving a beacon frame signal from the wireless access point at the orbiting spacecraft comprising access point identification information;
   storing the access point identification information in a non-transitory computer readable medium;
   pointing an antenna of the orbiting spacecraft to the wireless access point based on the access point identification information; and
   establishing a communication with the wireless access point using the antenna.

2. The method of claim 1, further comprising selecting the wireless access point from the wireless access point database based on a future orbital position of the orbiting spacecraft.

3. The method of claim 1, further comprising transmitting the beacon frame signal through a closed commercial network.

4. The method of claim 1, further comprising selecting the wireless access point from the wireless access point database based on a wireless access point location of the wireless access point.

5. The method of claim 1, further comprising:
   receiving the beacon frame signal from the wireless access point at the orbiting spacecraft;
   measuring a received signal strength indicator (RSSI) for the beacon frame signal; and
   adding the received signal strength indicator (RSSI) and the beacon frame signal to the wireless access point database.

6. The method of claim 1, further comprising ranking a plurality of wireless access points of the wireless access point database based on a received signal strength indicator (RSSI) for the beacon frame signal of the wireless access points respectively.

7. The method of claim 1, further comprising selecting the wireless access point from a wireless local area network.

8. The method of claim 1, further comprising controlling a power of the communication with the wireless access point based on a wireless access point location of the wireless access point.

9. The method of claim 8, further comprising controlling the power of the communication with the wireless access point to conform to a regional wireless operational power regulation based on the wireless access point location of the wireless access point.

10. The method of claim 1, further comprising controlling the orbiting spacecraft using the communication with the wireless access point.

11. The method of claim 1, further comprising Doppler compensating communication signals for the communication based on the orbital position.

12. A system for spacecraft wireless access and networking, the system comprising:
- a navigation module configured to determine an orbital position of an orbiting spacecraft;
- a wireless access point database module configured to store at least one access point identification information in a non-transitory computer readable medium;
- a network tracking module configured to select at least one wireless access point of a terrestrial wireless communication network from the wireless access point database module based on the orbital position;
- a beacon search module configured to receive at least one beacon frame signal from the wireless access point at the orbiting spacecraft comprising the at least one access point identification information;
- an antenna pointing module configured to point an antenna of the orbiting spacecraft to the at least one wireless access point based on the at least one access point identification information; and
- a communication module configured to establish a communication with the wireless access point using the antenna.

13. The system of claim 12, further comprising:
the beacon search module further configured to:
- receive the beacon frame signal from the wireless access point at the orbiting spacecraft; and
- measure a received signal strength indicator (RSSI) for the beacon frame signal;

the navigation module further configured to determine a wireless access point location of the wireless access point; and the wireless access point database module configured to add the received signal strength indicator (RSSI) and the wireless access point location to the wireless access point database based on the wireless access point location.

14. The system of claim 12, wherein the wireless access point comprises at least one of: an IEEE 802.11™ access point, an IEEE 802.16™ access point, an industrial, scientific and medical (ISM) band access point, a Digital Enhanced Cordless Telecommunications (DECT)™ access point, a High Performance Radio LAN (HiperLAN)™ access point, a Worldwide Interoperability for Microwave Access (WiMAX)™ access point, a High Performance Radio Metropolitan Area Network (HiperMAN)™, and an ultra-wideband access point.

15. A method for configuring a wireless local area network access point database for spacecraft wireless access, the method comprising:
- receiving a beacon frame signal from a wireless access point at an orbiting spacecraft;
- measuring a wireless access point received signal strength indicator (RSSI) for the beacon frame signal;
- determining a wireless access point location of the wireless access point; and
- adding the wireless access point received signal strength indicator (RSSI) and the wireless access point location to a wireless access point database based on the wireless access point location.

16. The method of claim 15, further comprising:
- determining if the wireless access point location is in a usable location; and
- adding the wireless access point received signal strength indicator (RSSI) and the wireless access point location to the wireless access point database, if the wireless access point location is in the usable location.

17. The method of claim 16, further comprising selecting the usable location to comprise at least one of: a known secure access point location, a non-hostile geographic area, and a non-problem access point location.

18. The method of claim 15, further comprising analyzing network traffic and packets of the wireless access point to collect intelligence on the wireless access point.

19. The method of claim 4, wherein the wireless access point location comprises at least one of: a known secure access point location, a non-hostile geographic area, and a non-problem access point location.

20. The method of claim 1, further comprising analyzing network traffic and packets of the wireless access point to collect intelligence on the wireless access point.

* * * * *